US010464244B2

(12) United States Patent
Aquilina et al.

(10) Patent No.: US 10,464,244 B2
(45) Date of Patent: Nov. 5, 2019

(54) INJECTION MOLD FOR ULTRA THIN WALL COMPONENTS

(71) Applicant: FCA US LLC, Auburn Hills, MI (US)

(72) Inventors: Daniel Aquilina, Lake Orion, MI (US); Gregory J Finn, White Lake, MI (US); Ketan Shah, Farmington Hills, MI (US); David V Olar, Troy, MI (US); David E Compeau, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 198 days.

(21) Appl. No.: 15/433,219

(22) Filed: Feb. 15, 2017

(65) Prior Publication Data
US 2018/0229411 A1 Aug. 16, 2018

(51) Int. Cl.
| | |
|---|---|
| *B29C 45/17* | (2006.01) |
| *B29C 45/26* | (2006.01) |
| *B29C 45/73* | (2006.01) |
| *B29C 45/40* | (2006.01) |
| *B29L 31/30* | (2006.01) |

(52) U.S. Cl.
CPC ............ *B29C 45/174* (2013.01); *B29C 45/26* (2013.01); *B29C 45/401* (2013.01); *B29C 45/73* (2013.01); *B29C 2045/7368* (2013.01); *B29L 2031/3041* (2013.01)

(58) Field of Classification Search
CPC ......... B29C 45/00; B29C 45/03; B29C 45/04; B29C 45/17
See application file for complete search history.

(56) References Cited

U.S. PATENT DOCUMENTS

| 5,429,786 A | * | 7/1995 | Jogan | ................ B29C 45/14336 156/245 |
|---|---|---|---|---|
| 5,626,704 A | * | 5/1997 | Bowers, Jr. | ........... B29C 65/028 156/245 |
| 5,672,397 A | * | 9/1997 | Bowers, Jr. | ....... B29C 45/14811 428/16 |
| 5,730,926 A | | 3/1998 | Matsumoto et al. | |
| 7,419,631 B2 | | 9/2008 | Guichard et al. | |
| 7,528,733 B2 | | 5/2009 | Guichard et al. | |
| 7,679,036 B2 | | 3/2010 | Feigenblum et al. | |
| 8,657,595 B2 | | 2/2014 | Feigenblum et al. | |
| 8,794,950 B2 | * | 8/2014 | Feigenblum | ............ B29C 33/06 425/174.8 R |
| 8,926,887 B2 | | 1/2015 | Guichard et al. | |
| 9,061,445 B2 | * | 6/2015 | Hinzpeter | ............... B29C 33/06 |

(Continued)

*Primary Examiner* — Nahida Sultana
(74) *Attorney, Agent, or Firm* — Ralph E. Smith

(57) ABSTRACT

An improved injection mold for forming an injection molded component. The injection mold includes a main cavity block and a main core block that are moveable with respect to one another. The main cavity block has a cavity block mating face that includes a first mold surface and the main core block has a core block mating face that includes a second mold surface. A plurality of induction heating coils extend within the main cavity block and a plurality of gas inlet channels extend through the main core block. The second mold surface includes a plurality ridges that cooperatively form a continuous gas flow path that is disposed in fluid communication with the plurality of as inlet channels. The continuous gas flow path follows a serpentine shape to provide even and uninterrupted gas flow across the second mold surface.

14 Claims, 4 Drawing Sheets

(56) References Cited

U.S. PATENT DOCUMENTS

| | | | | |
|---|---|---|---|---|
| 9,248,598 B2* | 2/2016 | Guichard | ................ | H05B 6/42 |
| 2008/0185747 A1* | 8/2008 | Uezaki | ............... | B29C 45/0025 |
| | | | | 264/40.5 |
| 2010/0001436 A1* | 1/2010 | Axelsson | ........... | B29C 45/1742 |
| | | | | 264/328.16 |
| 2011/0115117 A1* | 5/2011 | Desmith | .............. | B29C 33/306 |
| | | | | 264/219 |
| 2014/0367892 A1* | 12/2014 | Stone | ................... | B29C 45/281 |
| | | | | 264/402 |

\* cited by examiner

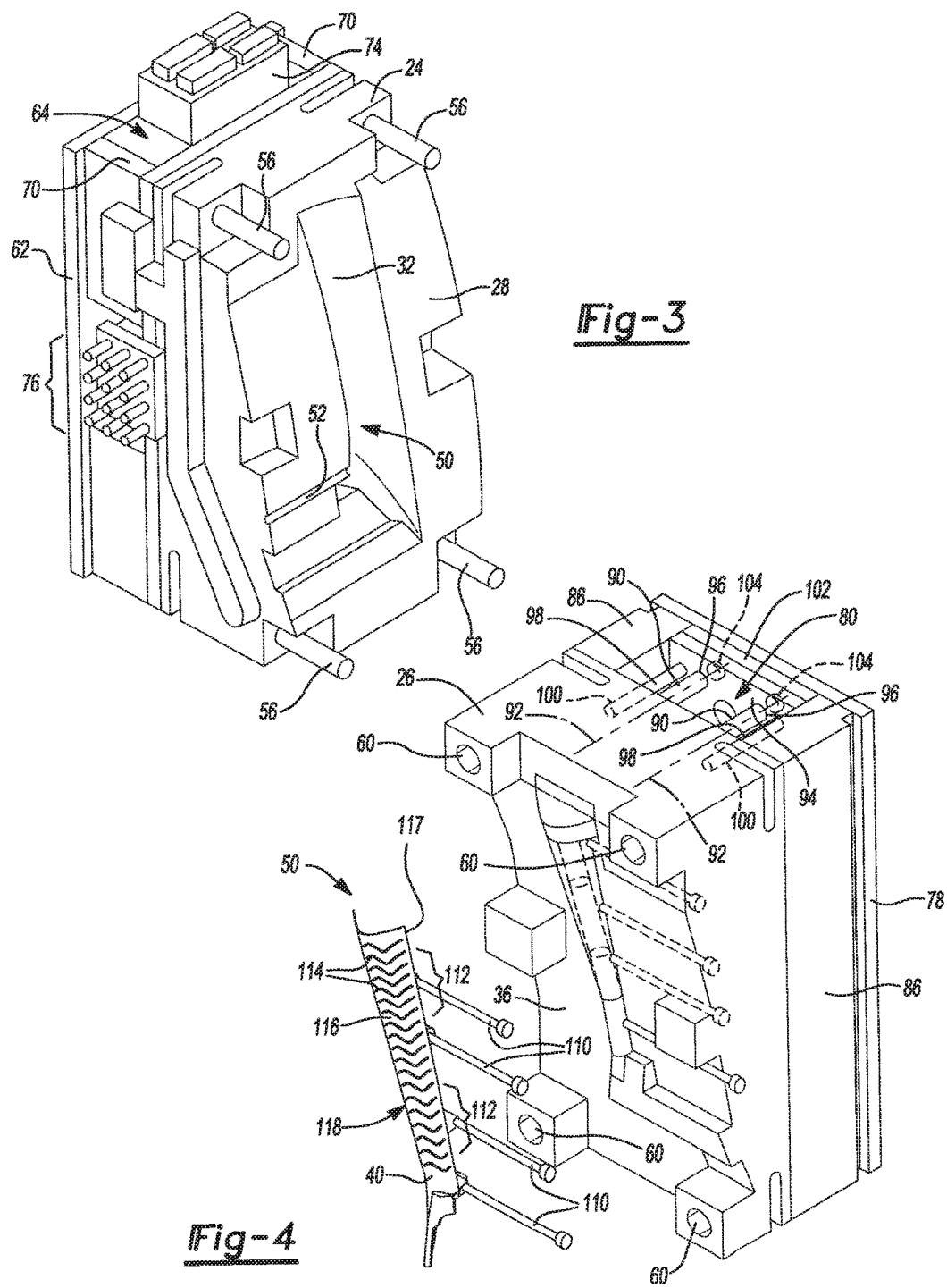

INJECTION MOLD FOR ULTRA THIN WALL COMPONENTS

FIELD

The present disclosure generally relates to injection molds for forming an injection molded component. More particularly, an injection mold for use in plastic injection molding operations is disclosed.

BACKGROUND

This section provides background information related to the present disclosure which is not necessarily prior art.

In the automotive industry, plastic injection molding is utilized to form many different components of an automobile. In particular, many interior trim components, such as A-pillar and B-pillar trim coverings, are formed by injection molding. Traditional injection molding manufacturing processes utilize an injection mold comprising a cavity block and a core block with mating faces that cooperatively define a mold cavity. Molten or semi-molten plastic is injected into the mold cavity when the cavity block and core block are brought together. After the plastic in the mold cavity cools and hardens, the cavity block and the core block are pulled apart and the injection molded component is removed or ejected from the mold cavity.

Within the automotive industry, it is common place to refer to the surface of interior trim components that faces the passenger compartment as the "A-side" and the surface that faces away from the passenger compartment as the "B-side." Because the A-side of interior trim components are visible to vehicle occupants, the appearance and surface finish of the A-side is an important design consideration. Uneven coloration, distortion, depressions, and weld lines on the A-side of interior trim components detract from the perceived quality of the vehicle and therefore are undesirable. These aesthetic concerns must be considered along with performance characteristics of interior trim components, including weight and rigidity. Typically, thin walled interior trim components with good A-side surface quality have poor rigidity, while thin walled components with good rigidity have poor A-side surface quality. This is due to the limitations of traditional injection molding equipment. As a result, interior trim components are typically made with relatively thick walls to ensure good rigidity and A-side surface quality at the cost of increased weight. However, there remains a need for an improved injection mold capable of creating injection molded components with good rigidity, good A-side surface quality, and thin walls for reduced weight.

SUMMARY

This section provides a general summary of the disclosure and is not a comprehensive disclosure of its full scope or all of its features.

An improved injection mold for forming an injection molded component is disclosed herein. The injection mold includes a main cavity block and a main core block that are moveable with respect to one another between a closed position and an ejection position. The main cavity block has a cavity block mating face and a cavity block distal face. The cavity block mating face includes a first mold surface. The main core block has a core block mating face and a core block distal face. The core block mating face includes a second mold surface. At least part of the cavity block mating face abuts at least part of the core block mating face when the main cavity block and the main core block are arranged in the closed position such that the first and second mold surfaces cooperate to define a mold cavity. In the ejection position, the cavity block mating face and the core block mating face are spaced apart so as to expose the mold cavity and allow for the ejection of the injection molded component from the mold cavity.

A plurality of induction heating coils extending within the main cavity block are positioned between the first mold surface and the cavity block distal face. A plurality of gas inlet channels extend through the main core block to the second mold surface and the second mold surface includes a plurality ridges that cooperatively form a continuous gas flow path that is disposed in fluid communication with the plurality of gas inlet channels. The plurality of ridges are arranged along the second mold surface such that the continuous gas flow path follows a serpentine shape across the second mold surface to provide even and uninterrupted gas flow across the second mold surface. Advantageously, the plurality of induction heating coils in the main cavity block and the continuous gas flow path formed by plurality of ridges on the second mold surface of the main core block work together to produce injection molded components with good rigidity, good A-side surface quality, and thin walls for reduced weight. By eliminating weight from interior trim components of a vehicle, the performance and efficiency of the vehicle can be improved.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a front perspective view of the main cavity block illustrated in FIG. 1 where a first mold surface of the main cavity block is shown;

FIG. 4 is a rear exploded perspective view of the main core block illustrated in FIG. 1 where a second mold surface of the main core block and a plurality of gas inlet channels are shown.

DETAILED DESCRIPTION

Referring to the Figures, wherein like numerals indicate corresponding parts throughout the several views, an injection mold 20 for forming an injection molded component 22 is disclosed.

Example embodiments are provided so that this disclosure will be thorough, and will fully convey the scope to those who are skilled in the art. Numerous specific details are set forth such as examples of specific components and devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Spatially relative terms, such as "inner," "outer," "beneath," "below," "lower," "above," "upper," "top," "bottom," "interior," "exterior," "distal," "proximal," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the Figures.

Figure 1:
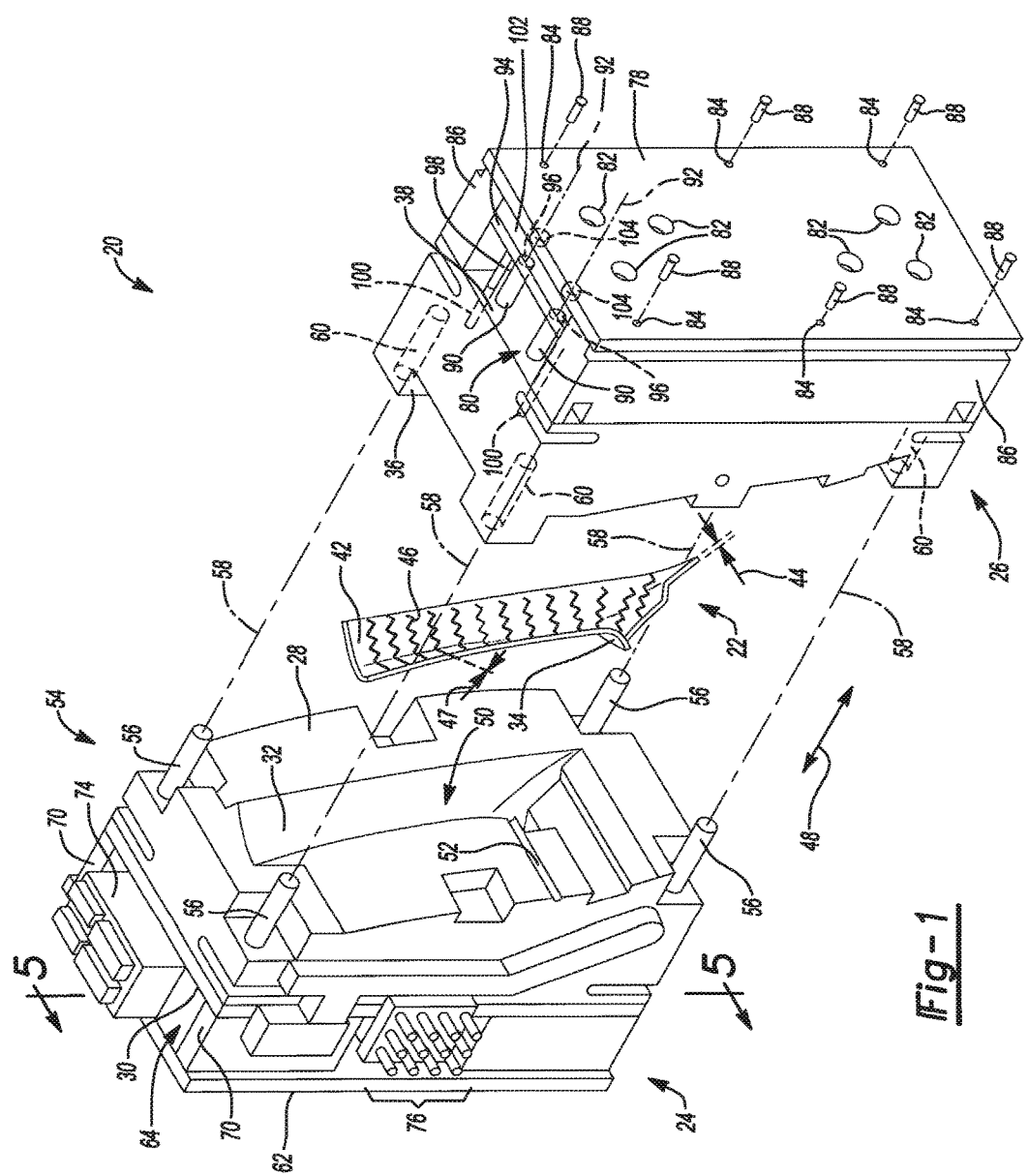
FIG. 1 is a front exploded perspective view of an exemplary injection mold constructed in accordance with the subject disclosure illustrating a main cavity block and main core block of the injection mold in an ejection position with an exemplary injection molded component positioned between the main cavity block and the main core block.
Figure 2:
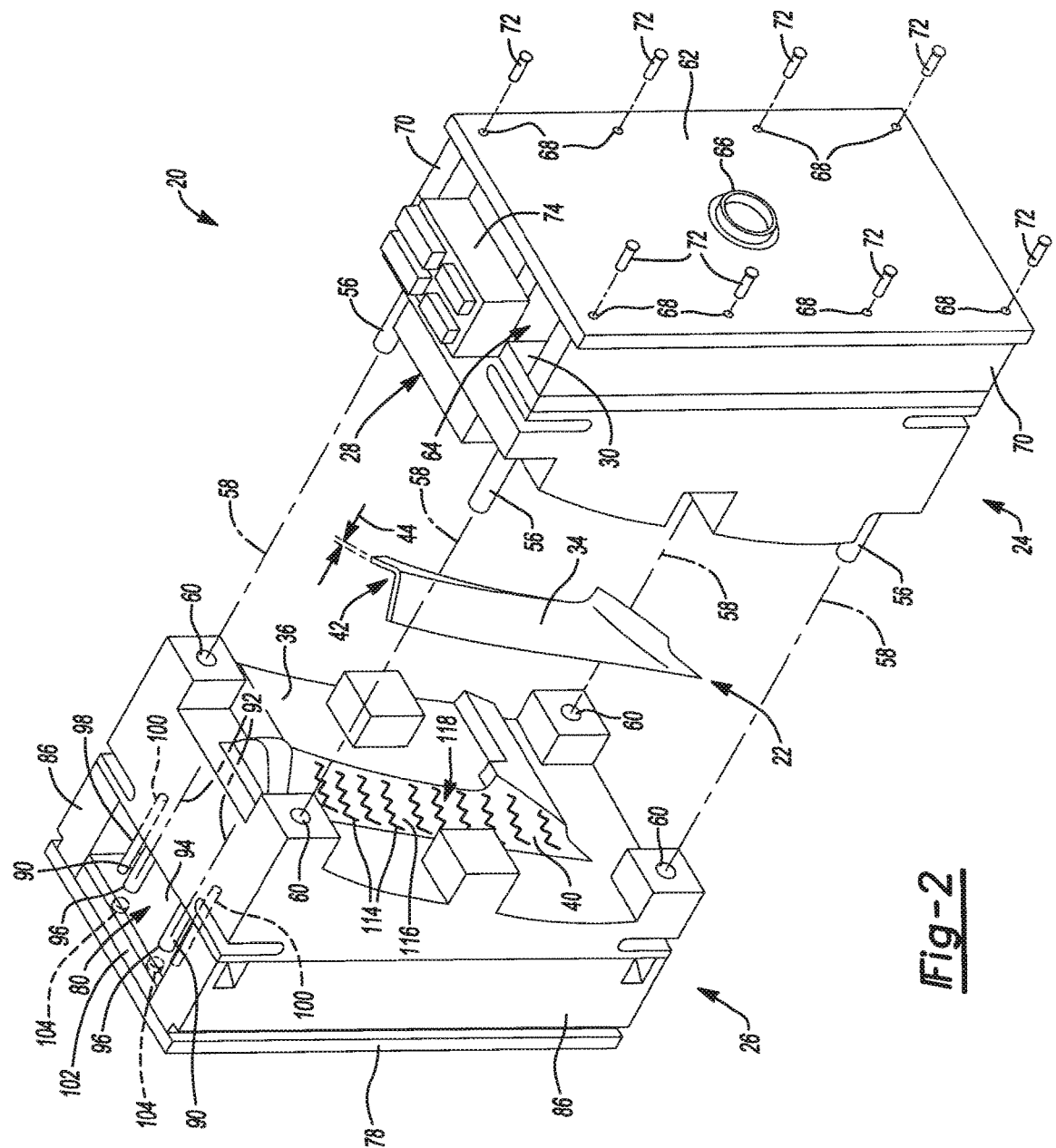
FIG. 2 is a rear exploded perspective view of the exemplary injection mold illustrated in FIG. 1 where the main cavity block and main core block of the injection mold are shown in the ejection position with the exemplary injection molded component positioned between the main cavity block and the main core block.

With reference to FIGS. 1 and 2, the injection mold 20 disclosed herein generally comprises a main cavity block 24 and a main core block 26. It should be appreciated that the injection mold 20 itself is a component of an injection molding machine (not shown). Among other things, the injection molding machine includes provisions that supply material, such as plastic, pressurized gas, such as nitrogen, and a coolant, such as water, to the injection mold 20 disclosed herein. The main cavity block 24 has a cavity block mating face 28 and a cavity block distal face 30 positioned opposite the cavity block mating face 28. The cavity block mating face 28 has a first mold surface 32. The first mold surface 32 of the main cavity block 24 operably forms an A-side surface 34 of the injection molded component 22. Although other configurations are possible, in the illustrated example, the first mold surface 32 has a concave shape and is smooth, meaning that the first mold surface 32 is rib-free. It should be appreciated that the concave shape of the first mold surface 32 gives the A-side surface 34 of the injection molded component 22 a convex shape. The main core block 26 has a core block mating face 36 and a core block distal face 38 positioned opposite the core block mating face 36. The core block mating face 36 includes a second mold surface 40. The second mold surface 40 of the main core block 26 operably forms a B-side surface 42 of the injection molded component 22. Although other configurations are possible, in the illustrated example, the second mold surface 40 has a convex shape. It should be appreciated that the convex shape of the second mold surface 40 gives the B-side surface 42 of the injection molded component 22 a concave shape.

The injection molded component 22 in the illustrated example is an A-pillar trim covering for an automobile. Notwithstanding, it should be appreciated that the injection mold 20 disclosed herein may be adapted to create other injection molded components, including other interior trim components of an automobile or other vehicle. The A-side surface 34 of the injection molded component 22 is designed to face the passenger compartment of a vehicle. The aesthetic appearance of the A-side surface 34 of the injection molded component 22, surface luster, uniformity of color, smoothness, and lack of the depressions and weld lines is important because the A-side surface 34 of the injection molded component 22 is visible to vehicle occupants when the injection molded component 22 is installed in a vehicle. The B-side surface 42 of the injection molded component 22 is designed to face away from the passenger compartment and be hidden from occupant view. The B-side surface 42 of the injection molded component 22 is arranged opposite the A-side surface 34 and is spaced from the A-side surface 34 by a nominal part thickness 44. In the example shown, the injection molded component 22 is a thin walled component, meaning that the injection molded component 22 has a nominal part thickness 44 of less than 2 millimeters (mm) and preferably a nominal part thickness 44 of 1.5 millimeters (mm). Ribs 46 extend from the B-side surface 42 of the injection molded component 22. The ribs 46 of the injection molded component 22 are arranged at a 1:1 rib to wall stock ratio to give the injection molded component 22 improved rigidity. Each of the ribs 46 has a rib thickness 47. The rib to wall stock ratio is a geometric parameter that specifies the rib thickness 47 relative to the nominal part thickness 44. It should be appreciated that traditional injection molds are limited to a 2:5 rib to wall stock ratio or less, which results in a less rigid component for any given nominal part thickness and material.

At least one of the main cavity block 24 and the main core block 26 is moveable along an actuation direction 48 so as to define a closed position and an ejection position of the injection mold 20. At least part of the cavity block mating face 28 abuts at least part of the core block mating face 36 when the main cavity block 24 and the main core block 26 are arranged in the closed position such that the first and second mold surfaces 32, 40 cooperatively define a mold cavity 50. The cavity block mating face 28 and the core block mating face 36 are spaced apart when the main cavity block 24 and the main core block 26 are arranged in the ejection position. When the main cavity block 24 and the main core block 26 are in the closed position, molten or semi-molten plastic material is injected into the mold cavity 50 through one or more injection ports 52. By way of non-limiting example, the plastic material may be thermoplastic olefin (TPO). Once the plastic material cools and hardens to some degree, the main cavity block 24 and the mating core block are separated and moved to the ejection position, at which time the injection molded component 22 is ejected from the mold cavity 50.

With reference to FIGS. 1-4, the injection mold 20 includes a block actuation mechanism 54 that moves the main cavity block 24 and the main core block 26 relative to one another between the closed position and the ejection position. It should be understood that the main cavity block 24 may remain stationary while the main core block 26 is moved towards and away from the main cavity block 24 by the block actuation mechanism 54, the main core block 26 may remain stationary while the main cavity block 24 is moved towards and away from the main core block 26 by the block actuation mechanism 54, or both the main cavity block 24 and the main core block 26 may be moved towards and away from one another by the block actuation mechanism 54. In all three scenarios the main cavity block 24 and the main core block 26 are moving relative to one another within the meaning of the subject disclosure. The block actuation mechanism 54 may take many forms. In the illustrated example, the block actuation mechanism 54 includes a plurality of leader guide pins 56 that extend outwardly from the cavity block mating face 28. Each leader guide pin 56 of the plurality of leader guide pins 56 extends along a leader guide pin axis 58. The leader guide pin axes 58 are parallel to one another and are generally transverse to the cavity block mating face 28 and the core block mating face 36. A plurality of leader guide pin holes 60 extend inwardly into the main core block 26 from the core block mating face 36. The plurality of leader guide pins 56 extend into and are slidingly received in the plurality of leader guide pin holes 60 in the main core block 26 such that the main core block 26 is moveable with respect to the main cavity block 24 between the closed position and the ejection position. In accordance with this arrangement, the actuation direction 48 of the block actuation mechanism 54 is parallel to the leader guide pin axes 58.

A cavity clamp plate 62 is spaced away from the cavity block distal face 30 in the actuation direction 48 to define an injection manifold 64 between the cavity clamp plate 62 and the cavity block distal face 30. The cavity clamp plate 62 includes a locating ring 66 and a plurality of cavity clamp plate fastener holes 68. At least two manifold spacer rails 70 extend between and connect to the cavity clamp plate 62 and the cavity block distal face 30. A plurality of cavity clamp plate fasteners 72 extend through the plurality of cavity clamp plate fastener holes 68 and into the at least two manifold spacer rails 70 to secure the cavity clamp plate 62 to the at least two manifold spacer rails 70. The locating ring 66 is used to position and align the injection mold 20 within the injection molding machine (not shown). A power box 74 is mounted to the main cavity block 24 adjacent to the injection manifold 64. The power box 74 is electrically connected to an electrical power source (not shown). One or more valve gate hook-ups 76 are disposed on one of the manifold spacer rails 70. The one or more valve gate hook-ups 76 are arranged in fluid communication with the one or more injection ports 52 and operably receive plastic material from the injection molding machine (not shown).

A core clamp plate 78 is spaced away from the core block distal face 38 in the actuation direction 48 to define an ejector cavity 80 between the core clamp plate 78 and the core block distal face 38. An ejector plate 102 is disposed in the ejector cavity 80. The core clamp plate 78 includes a plurality of ejector knock-out holes 82 and a plurality of core clamp plate fastener holes 84. At least two ejector support rails 86 extend between and connect to the core clamp plate 78 and the core block distal face 38. A plurality of core clamp plate fasteners 88 extend through the plurality of core clamp plate fastener holes 84 and into the at least two ejector support rails 86 to secure the core clamp plate 78 to the at least two ejector support rails 86. The plurality of ejector knock-out holes 82 receive ejectors (not shown) of the injection molding machine (not shown) that actuate the ejector plate 102 to demold (i.e. eject) the injection molded component 22 from the injection mold 20.

A plurality of ejection guide pins 90 extend through the ejector cavity 80 between the core clamp plate 78 and the core block distal face 38. Each ejection guide pin 90 of the plurality of ejection guide pins 90 extends along an ejection guide pin axis 92. The ejection guide pin axes 92 are parallel with one another and are parallel with the leader guide pin axes 58. A retainer plate 94 is disposed in the ejector cavity 80 between the at least two ejector support rails 86. The retainer plate 94 includes a plurality of retainer plate guide holes 96. The plurality of ejection guide pins 90 extend through and are slidingly received in the plurality of retainer plate guide holes 96 such that the retainer plate 94 is moveable within the ejector cavity 80 in the actuation direction 48 between the core clamp plate 78 and the core block distal face 38. The retainer plate 94 stops the ejectors (not shown) at a full stroke position of the ejector plate 102. A plurality of ejection return pins 98 extend from the retainer plate 94. The plurality of ejection return pins 98 are parallel with the plurality of leader guide pins 56 and the plurality of ejection guide pins 90. The main core block 26 includes a plurality of ejection return pin holes 100 that extend into the main core block 26 from the core block distal face 38. The plurality of ejection return pins 98 extends into and can be slidingly received in the plurality of ejection return pin holes 100 in the main core block 26. The plurality of ejection return pins 98 are used to bring back the ejector plate 102 to an initial position when the injection mold 20 is closed. The ejector plate 102 is disposed in the ejector cavity 80 between the at least two ejector support rails 86 and between the core clamp plate 78 and the retainer plate 94. The ejector plate 102 includes a plurality of ejector plate guide holes 104. The plurality of ejection guide pins 90 extend through and are slidingly received in the plurality of ejector plate guide holes 104 such that the ejector plate 102 is moveable within the ejector cavity 80 in the actuation direction 48 between the core clamp plate 78 and the core block distal face 38. The ejector plate 102 moves within the ejector cavity 80 to demold (i.e. eject) the injection molded component 22 from the injection mold 20.

Figure 5:
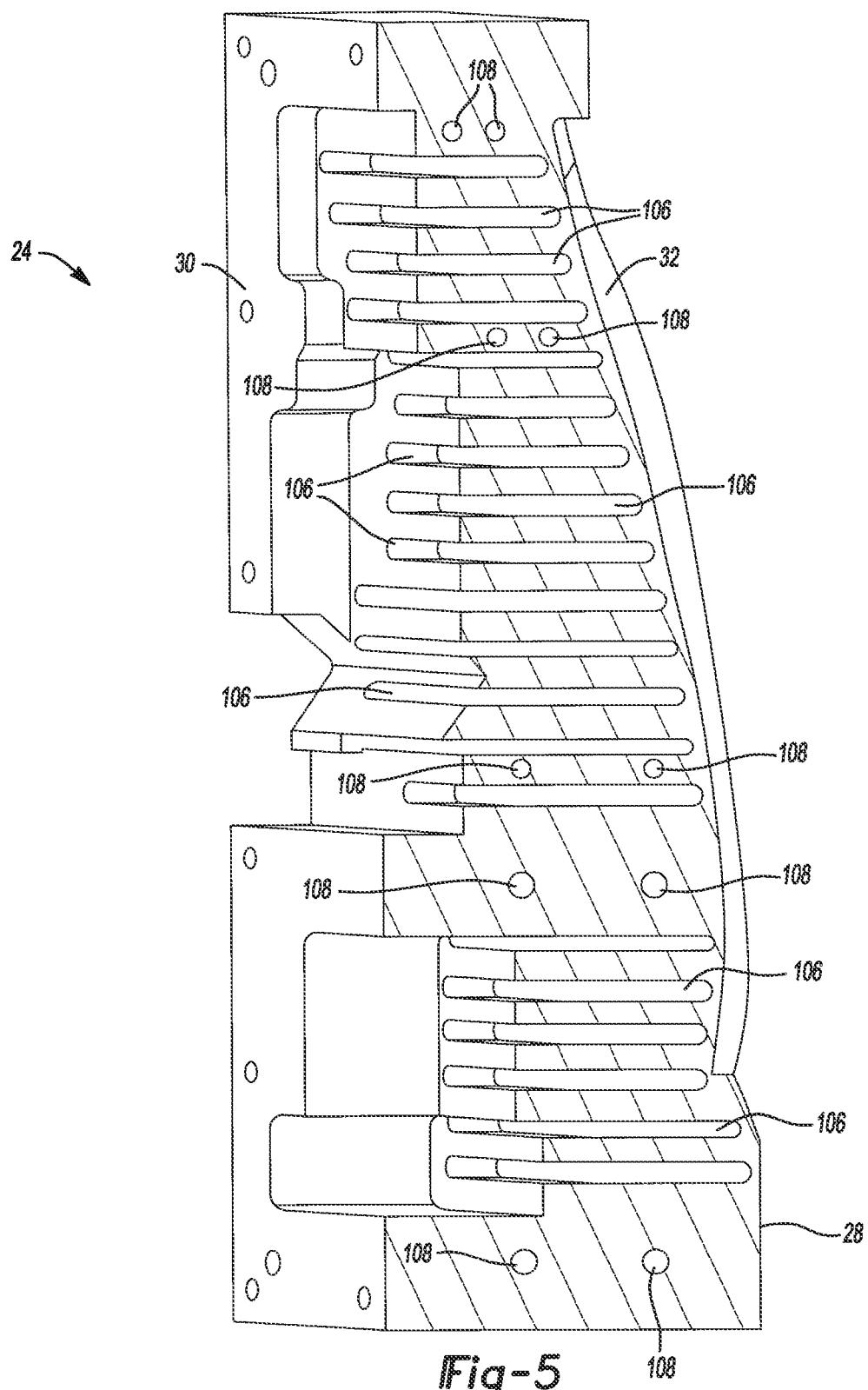
FIG. 5 is a side perspective section view of the main cavity block illustrated in FIG. 1 taken along section line 5-5.

With additional reference to FIG. 5, a plurality of induction heating coils 106 extend within the main cavity block 24. The plurality of induction heating coils 106 are positioned between the first mold surface 32 and the cavity block distal face 30. Although the induction heating coils 106 may take different forms, in the illustrated example, the induction heating coils 106 are formed as multiple loops or windings of one or more continuous copper filaments. The plurality of induction heating coils 106 are electrically connected to the power box 74. In operation, the power box 74 supplies electric current to the induction heating coils 106, which in turn heats the first mold surface 32. The main cavity block 24 also has a plurality of cooling channels 108 that extend within the main cavity block 24. The plurality of cooling channels 108 are positioned between the cavity block mating face 28 and the cavity block distal face 30. In operation, coolant (e.g. water) from the injection molding machine (not shown) is supplied to the plurality of cooling channels 108 in the main cavity block 24. Coolant flow through the cooling channels 108 regulates the temperature of the main cavity block 24 and can be used to cool (e.g. quench) the first mold surface 32 and thus the A-side surface 34 of the injection molded component 22.

As best seen in FIGS. 2 and 4, a plurality of gas inlet channels 110 extend through the main core block 26 to a plurality of gas inlet inserts 112 that are disposed along the second mold surface 40. In operation, pressurized gas from the injection molding machine (not shown) is supplied to the plurality of gas inlet channels 110 in the main core block 26. The plurality of gas inlet channels 110 transport the pressurized gas to the plurality of gas inlet inserts 112, where the pressurized gas is injected into the mold cavity 50. A plurality of ridges 114 protrude from the second mold surface 40 to cooperatively form a continuous gas flow path 116 that is disposed in fluid communication with the plurality of gas inlet inserts 112 and the plurality of gas inlet channels 110. The second mold surface 40 has an outer perimeter 117. The plurality of ridges 114 do not extend to the outer perimeter 117 of the second mold surface 40 (i.e.

terminate before reaching the outer perimeter 117 of the second mold surface 40) and are arranged such that the continuous gas flow path 116 follows a serpentine shape across the second mold surface 40 to provide even and uninterrupted gas flow across the second mold surface 40. In operation, the pressurized gas in the continuous gas flow path 116 defined by the plurality of ridges 114 supports the B-side surface 42 of the injection molded component 22 as the ribs 46 of the injection molded component 22 are formed as molten or semi-molten plastic material flows in between the plurality of ridges 114 on the second mold surface 40. The second mold surface 40 has a predetermined surface area 118 that is coextensive with the B-side surface 42 of the injection molded component 22. The plurality of ridges 114 and the continuous gas flow path 116 extend across at least 50 percent of the predetermined surface area 118 of the second mold surface 40 such that a majority of the B-side surface 42 of the injection molded component 22 is supported by the pressurized gas in the continuous gas flow path 116. Although many patterns are possible, in the illustrated example, the plurality of ridges 114 form a zig-zag pattern on the second mold surface 40.

Advantageously, the plurality of induction heating coils 106 in the main cavity block 24 and the continuous gas flow path 116 formed by plurality of ridges 114 on the second mold surface 40 of the main core block 26 work together to produce injection molded components 22 with good rigidity, good A-side surface quality, and thin walls for reduced weight. The ribs 46 extending from the B-side surface 42 of the injection molded component 22 provide increased rigidity. As noted above, the injection mold 20 disclosed herein is capable of creating injection molded components 22 having nominal part thicknesses 44 of less than 2 millimeters (mm) with a 1:1 rib to wall stock ratio. When using traditional injection molds 20, one problem that arises when creating thin walled injection molded components 22 with ribs 46 is that sinks (i.e. depressions) and other aesthetic flaws form on the A-side surface 34 of the injection molded component 22 opposite the ribs 46. This problem intensifies as the nominal part thickness 44 is decreased or when the rib to wall stock ratio is increased. In the subject injection mold 20, the plurality of induction heating coils 106 in the main cavity block 24 heats the first mold surface 32 and thus the A-side surface 34 of the injection molded component 22 to a temperature of 350 to 380 degrees Fahrenheit (° F.). At this temperature, the plastic material at the A-side surface 34 of the injection molded component 22 is in a molten state. At the same time, pressurized gas is injected into the continuous gas flow path 116 defined by the plurality of ridges 114 on the second mold surface 40 at a pressure of 3,000 pounds per square inch (psi) for 10 seconds (s) to support the B-side surface 42 of the injection molded component 22. The combination of the heat provided by the plurality of induction heating coils 106 to the A-side surface 34 of the injection molded component 22 and the support provided by the pressurized gas to the B-side surface 42 of the injection molded component 22 allows for nominal part thicknesses 44 of less than 2 millimeters (mm) without the formation of sinks and other imperfections on the A-side surface 34 of the injection molded component 22 opposite the ribs 46. As a result, an overall weight reduction of 25 percent for injection molded components 22, such as A-pillar trim coverings has been realized. In addition, the injection pressure of the plastic material into the mold cavity 50 can be reduced from typical pressures of 1,200 pounds per square inch (psi) to an injection pressure of 800 pounds per square inch (psi) for reduced internal stresses in the injection molded component 22. Other advantages of the subject injection mold 20 include improved appearance, consistency, and gloss on the A-side surface 34 of the injection molded component 22 and minimized weld lines on the injection molded component 22.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An injection mold for forming an injection molded component comprising:
    a main cavity block having a cavity block mating face and a cavity block distal face, said cavity block mating face including a first mold surface;
    a main core block having a core block mating face and a core block distal face, said core block mating face including a second mold surface;
    at least one of said main core block and said main cavity block being moveable so as to define a closed position and an ejection position of the injection mold;
    at least part of said cavity block mating face abutting at least part of said core block mating face when said main cavity block and said main core block are arranged in said closed position with said first and second mold surfaces cooperatively defining a mold cavity therebetween and said cavity block mating face and said core block mating face being spaced apart when said main cavity block and said main core block are arranged in said ejection position;
    a plurality of induction heating coils extending within said main cavity block that are positioned between said first mold surface and said cavity block distal face;
    a plurality of gas inlet channels extending through said main core block to said second mold surface;
    said second mold surface including a plurality ridges that cooperatively form a continuous gas flow path that is disposed in fluid communication with said plurality of gas inlet channels, said plurality of ridges being arranged such that said continuous gas flow path follows a serpentine shape across said second mold surface to provide uninterrupted gas flow across said second mold surface.

2. The injection mold as set forth in claim 1, further comprising:
    a core clamp plate spaced from said core block distal face to define an ejector cavity between said core clamp plate and said core block distal face; and
    at least two ejector support rails extending between and connecting said core clamp plate and said core block distal face.

3. The injection mold as set forth in claim 2, further comprising:
    a plurality of ejection guide pins extending through said ejector cavity between said core clamp plate and said core block distal face, said plurality of ejection guide pins being parallel with one another.

4. The injection mold as set forth in claim 3, further comprising:

an ejector plate disposed in said ejector cavity between said at least two ejector support rails and between said core clamp plate and said core block distal face, said ejector plate including a plurality of ejector plate guide holes, and said plurality of ejection guide pins extending through and being slidingly received in said plurality of ejector plate guide holes such that said ejector plate is moveable within said ejector cavity between said core clamp plate and said core block distal face.

5. The injection mold as set forth in claim 4, further comprising:
a retainer plate disposed in said ejector cavity between said at least two ejector support rails, said retainer plate including a plurality of retainer plate guide holes, and said plurality of ejection guide pins extending through and being slidingly received in said plurality of retainer plate guide holes such that said retainer plate is moveable within said ejector cavity between said core clamp plate and said core block distal face.

6. The injection mold as set forth in claim 5, further comprising:
a plurality of ejection return pins extending from said retainer plate, said main core block including a plurality of ejection return pin holes extending into said main core block from said core block distal face, and said plurality of ejection return pins extending into and being slidingly received in said plurality of ejection return pin holes in said main core block.

7. The injection mold as set forth in claim 1, further comprising:
a plurality of leader guide pins extending outwardly from said cavity block mating face, said plurality of leader guide pins being parallel to one another; and
a plurality of leader guide pin holes extending inwardly into said main core block from said core block mating face.

8. The injection mold as set forth in claim 7, wherein said plurality of leader guide pins extend into and are slidingly received in said plurality of leader guide pin holes in said main core block such that said main core block is moveable with respect to said main cavity block between said closed position and said ejection position along an actuation direction that is parallel to said plurality of leader guide pins.

9. The injection mold as set forth in claim 1, further comprising:
a cavity clamp plate spaced from said cavity block distal face to define an injection manifold between said cavity clamp plate and said cavity block distal face; and
at least two manifold spacer rails extending between and connecting said cavity clamp plate and said cavity block distal face.

10. The injection mold as set forth in claim 1, wherein said main cavity block has a plurality of cooling channels extending within said main cavity block that are disposed between said cavity block mating face and said cavity block distal face.

11. The injection mold as set forth in claim 1, wherein said plurality of ridges form a zig-zag pattern on said second mold surface.

12. The injection mold as set forth in claim 1, wherein said first mold surface is smooth.

13. The injection mold as set forth in claim 1, wherein said first mold surface has a concave shape and said second mold surface has a convex shape.

14. The injection mold as set forth in claim 1, wherein said second mold surface has a predetermined surface area and wherein said plurality of ridges and said continuous gas flow path extend across more than 50 percent of said predetermined surface area of said second mold surface.

* * * * *